(12) United States Patent
Buniatyan (10) Patent No.: US 7,349,719 B2
(45) Date of Patent: Mar. 25, 2008

(54) PORTABLE UNIVERSAL DATA STORAGE DEVICE

(76) Inventor: Spartak Buniatyan, 3005 Mesa Verde Dr., Burbank, CA (US) 91504

( * ) Notice: Subject to any disclaimer, the term of this patent is extended or adjusted under 35 U.S.C. 154(b) by 0 days.

(21) Appl. No.: 11/070,782

(22) Filed: Mar. 2, 2005

(65) Prior Publication Data

US 2005/0208967 A1 Sep. 22, 2005

Related U.S. Application Data (60) Provisional application No. 60/549,385, filed on Mar. 2, 2004.

(51) Int. Cl.
*H04B 1/38* (2006.01)

(52) U.S. Cl. .................... 455/557; 455/414.1; 455/558; 455/556.1; 455/432.2; 455/435.1

(58) Field of Classification Search ................ 455/418, 455/419, 420, 414.1, 432.2, 435.3, 435.2, 455/550.1, 556.1, 557.7, 558, 557, 569.1
See application file for complete search history.

(56) References Cited

U.S. PATENT DOCUMENTS

| | | | |
|---|---|---|---|
| 5,335,276 A | | 8/1994 | Thompson et al. |
| 5,465,401 A | | 11/1995 | Thompson |
| 5,487,099 A | | 1/1996 | Maekawa |
| 5,490,202 A | | 2/1996 | Maekawa |
| 5,666,495 A | * | 9/1997 | Yeh ............................ 710/303 |
| 5,966,669 A | * | 10/1999 | Kenmochi et al. .......... 455/557 |
| 6,081,730 A | | 6/2000 | Lieben et al. |
| 6,134,660 A | * | 10/2000 | Boneh et al. ................ 713/193 |
| 6,529,744 B1 | | 3/2003 | Birkler et al. |
| 6,577,877 B1 | * | 6/2003 | Charlier et al. ............. 455/557 |
| 6,614,984 B2 | | 9/2003 | Rigatti |
| 6,625,472 B1 | * | 9/2003 | Farazmandnia et al. .... 455/557 |
| 7,092,671 B2 | * | 8/2006 | Lunsford et al. ........... 455/41.2 |
| 7,107,043 B2 | * | 9/2006 | Aoyama ................... 455/412.1 |
| 7,146,161 B2 | * | 12/2006 | Chou .......................... 455/418 |
| 7,187,919 B2 | * | 3/2007 | Fukuzato ..................... 455/410 |
| 2001/0041593 A1 | | 11/2001 | Asada |
| 2001/0044331 A1 | | 11/2001 | Miyoshi et al. |
| 2002/0102938 A1 | | 8/2002 | Tsubaki et al. |
| 2003/0054858 A1 | * | 3/2003 | Yambe ........................ 455/557 |
| 2003/0098670 A1 | | 5/2003 | Kobayashi |
| 2003/0100292 A1 | | 5/2003 | Kynast et al. |
| 2003/0157960 A1 | | 8/2003 | Kennedy |
| 2003/0224823 A1 | | 12/2003 | Hurst et al. |
| 2003/0236104 A1 | | 12/2003 | Lin |
| 2004/0005910 A1 | | 1/2004 | Tom |
| 2004/0063464 A1 | * | 4/2004 | Akram et al. ............... 455/559 |
| 2004/0116155 A1 | * | 6/2004 | Aisenberg ................... 455/558 |
| 2004/0123127 A1 | * | 6/2004 | Teicher et al. .............. 713/193 |
| 2004/0136224 A1 | * | 7/2004 | Hamer et al. ............... 365/145 |
| 2004/0235514 A1 | * | 11/2004 | Bloch et al. .............. 455/550.1 |
| 2004/0235523 A1 | * | 11/2004 | Schrire et al. .............. 455/558 |
| 2004/0260973 A1 | * | 12/2004 | Michelman .................. 714/13 |
| 2005/0022055 A1 | * | 1/2005 | Ho ................................ 714/13 |
| 2005/0090940 A1 | * | 4/2005 | Pajakowski et al. ........... 701/1 |
| 2005/0125460 A1 | * | 6/2005 | Yu e al. ....................... 707/203 |

* cited by examiner

*Primary Examiner*—Rafael Perez-Gutierrez
*Assistant Examiner*—Kwasi Karikari
(74) *Attorney, Agent, or Firm*—Loza & Loza LLP; Julio Loza (57) ABSTRACT

A portable universal data storage device that includes an universal port adapter for connecting to a personal electronic device including a memory for storing a plurality of communication protocols; a second memory for storing device data; an interface port detection module for detecting a communication protocol for the personal electronic device; and a processor for selecting the detected communication protocol for the personal electronic device from the stored plurality of communication protocols and establishing a communication link with the personal electronic device.

27 Claims, 9 Drawing Sheets

PORTABLE UNIVERSAL DATA STORAGE DEVICE

CROSS-REFERENCE TO RELATED APPLICATION

This Patent Application claims the benefit of the filing date of U.S. Provisional Patent Application Ser. No. 60/549,385, filed on Mar. 2, 2004 and entitled "CELLULAR PHONE DATA BACKUP DEVICE," the entire content of which is hereby expressly incorporated by reference.

FIELD OF THE INVENTION

The present invention relates generally to back up storage devices; and more particularly to a portable universal data storage device.

BACKGROUND OF THE INVENTION

In the past decade, the industry of portable and home electronics has seen an unprecedented growth. Devices such as cellular phones, digital cameras, digital music players, and Personal Digital Assistants (PDAs) have entered the market and quickly become part of mainstream use.

In the last decade, for instance, the use of cellular/mobile (hereinafter, "cell") phones has been steadily rising. As an example, in 1992, there were about 10 million cell phone users worldwide. Yet by year 2000, that number grew to 700 million, representing a Compound Annual Growth Rate (CAGR) of 70 percent. The advent in technology and sheer convenience of having this technology within mobile devices have compelled most cell phone users to rely on their phones for storing contact information, making schedules, and even leaving memos. As a result, cell phones today not only facilitate communication, but also act as a storage for a great deal of valuable data formats.

With millions of portable electronic devices, such as cell phones, lost or damaged yearly, it is not difficult to see that an effective method of backing up this valuable data is needed.

Today, most cell phones in the market attempt to address the issue of potential data loss by offering computer to cell phone communication options. These options enable cell phone users to edit and backup valuable cell phone data on their Personal Computers (PCs) or laptop computers. Although this method can be effective in securing cell phone data, it does not present a total solution. First, the described option requires both, the possession of a computer, and a relatively high level of computer savvy. Second, it requires a purchase of an expensive, higher-end cell phone model. Third, this method calls for separately purchased cables and software necessary for the communication process, and both the hardware and software will only work with specific brand or model. Finally, if one is switching carriers, or upgrading to a new brand or model, it will still require a manual transfer of data from one system into another.

Another cell phone data backup method that has recently emerged is a SIM (Subscriber Identity Module) card copy device. A SIM card is a card that allows a cell phone to access the global telecommunications network. The SIM card stores the user's unique identification info, as well as other user data such as phone numbers, contact info, and SMS (short message services) messages. The use of SIM card copy device involves taking the SIM card out of the cell phone, inserting it into the device and activating the backup/copy process. Although copying the data stored on the phone's SIM card provides the user with a greater sense of security, this method too, is not without its shortcomings. First, this approach requires a user to carefully dismantle sensitive equipment and to pull out the fragile card without causing damage to it. Second, only data stored on the SIM card is copied, while the phone's memory remains without a backup copy. Finally, since only cell phones within the Global System for Mobile Communications (GSM) system use the SIM cards, this is not a universal solution.

SUMMARY OF THE INVENTION

In one embodiment, the present invention is an universal data storage device (USD) interfaces with an array of portable and home electronics, including cell phones, digital cameras, portable mp3-players, computers, and other personal electronic devices.

DETAILED DESCRIPTION

According to one embodiment of the present invention, a cell phone backup device has been designed to be a simple and effective solution for securing cell phone data. The device is simple enough to be used by novice users, and yet sophisticated enough to meet the demands of computer experts. The device is a small-sized, battery-powered, inexpensive hardware solution for cell phone data backup and restoration needs.

In one embodiment, a portable universal data storage device (USD) according to the invention includes two buttons and an indicator LED. This configuration simplifies the process of backing up cell phone data to two main steps of 1) connecting the device to the cell phone, and 2) pressing the backup button. The process of restoring contacts back into the phone is just as simple and is performed by pressing a restore button. The USD reads a serial number of an unique device, prior to downloading. This prevents unintentional overwrites from an unauthorized (unidentified) cell phone. A LED status indicator provides accurate and reliable communication and operation status information. An exemplary LED interpretation chart is depicted in Table 1 below.

Once an appropriate adapter is selected and the device is connected to a host, such as a PC, a user is able to easily delete and edit stored information, export the information into delimited formats to be used by other computer software programs, and save a copy of data locally on the PC.

Figure 1A:
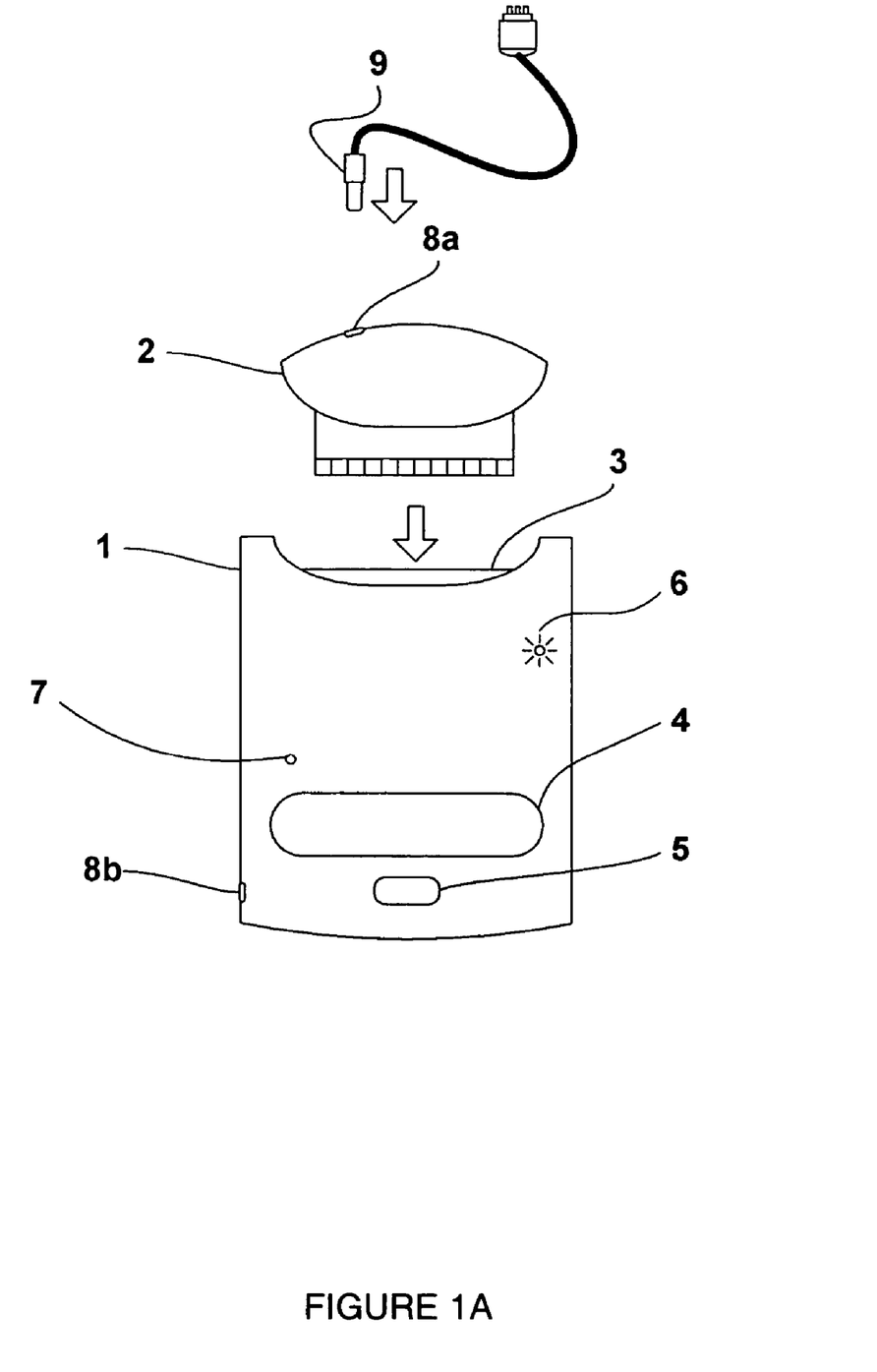
FIGS. 1A and 1B show two exemplary embodiments of a cell phone backup device, according to the present invention.
Figure 1B:
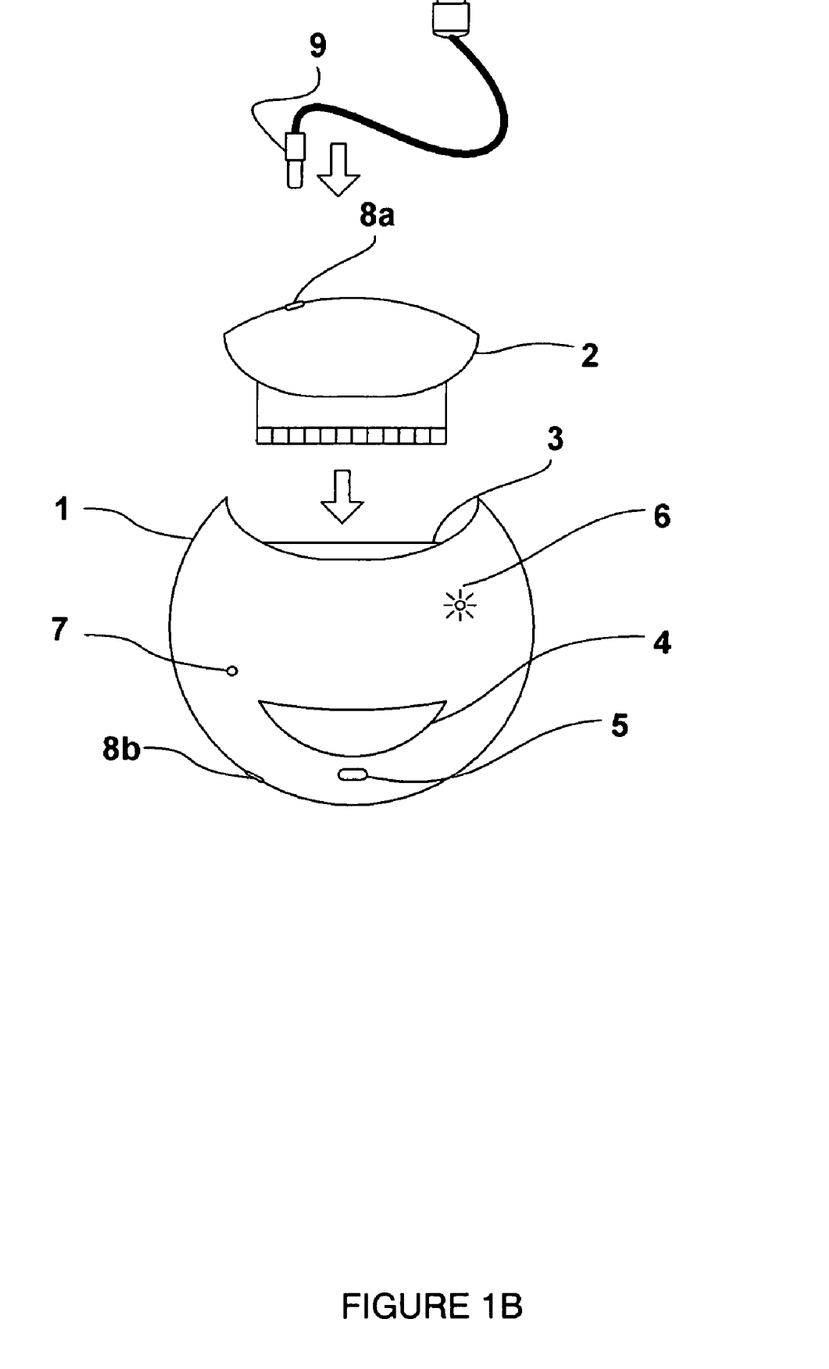

FIGS. 1A and 1B show two exemplary embodiments of the USD. As shown, the USD includes a main unit 1, an interface adapter 2, an interface adapter port 3, a backup button 4, a restore button 5, a status LED 6, a format button 7 and device interface ports 8a and 8b. Device interface port 8a supports a data cable 9 for connecting the interface adapter 2 to an external device, such as a cell phone, a PC, etc. Device interface port 8b is an optional port on the main unit 1 that supports communication with a host.

In one embodiment, device interface port 8a is used for communication with both an external device, such as a cell phone and a host, such as a PC.

Although the exemplary embodiments of the present invention are described with reference to data communication between the invention and cell phones, it is understood that the invention is not limited to data communication to/from a cell phone. Other devices such as, digital cameras, portable mp3-players, computers, and other personal electronic devices are well within the scope of the present invention.

The main unit 1 plugs into a communication port (for example, serial, Bus, IRDA, Bluetooth, etc.) of a personal electronic device, such as a cell phone, and backs up the phonebook and other personal data by copying the information onto USD's storage component. USD's storage options may include an internal memory unit or an external memory chip (for example, Compact Flash, Secure Digital, Secure Media etc.) which can be inserted to a proper slot and serve to backup the information from the cell phone.

Typically, each cell phone has a built in one or more of a serial, bus, IRDA, Bluetooth, or other data communication port and supporting protocols. In order for the invention to backup or restore the data from the cell phone, a proper communication protocol needs to be established between the cell phone and the USD via one of the cell phone's communication ports. This connection is made through the serial, bus, IRDA, Bluetooth or some other port, depending on the cell phone model.

Once the USD is connected to a supported phone, it supports the necessary protocols and commands to establish a communication link to carry out the necessary data exchange. In one embodiment, when the backup or restore button is pressed, the device flashes for example, a yellow light indicating an active status. Upon the completion of the backup or restore operation, a green light appears. If any errors occur during this process, a flashing red light appears.

Additionally, for the more sophisticated users, the USD incorporates an easy interface to one of the PC's communication ports, which allows the contents of the USD to be easily transferred, manipulated and backed-up in the PC.

In one embodiment, the main unit 1 includes a plastic casing, essential circuitry, a battery, and one or more memory chips. It also includes buttons and LED/LCD indicators. Pressing and holding a Backup button activates the backup process of the USD. Pressing and holding a Restore button activates the restore process of the USD. In one embodiment, pressing and holding a Format Button clears all the data stored in USD's own memory or an external media card. The LED/LCD indicator is the device's primary means of communicating with the user. The color and pattern variations of the LED indicator serve as an informative messaging system, providing a real-time update on the device's status. Table 1 below includes some examples of different states of the indicators and their respective meanings.

The interface adapter 2 plugs into the main unit 1. The interface adapter gives the USD its greatest flexibility. Based on the type of cell phone used or a desired operation, an appropriate adapter needs to be selected. Whether connecting to a specific phone via cables or infrared, attaching to a computer, or even making USD act as a SIM card reader, a suitable interface adapter needs to be connected to the main unit.

In one embodiment, a firmware protocol for each of the supported interface protocols is stored in the memory of the USD. When a respective interface is detected by a universal adapter interface, the appropriate firmware protocol is loaded to the main unit's communication logic and the communication between the cell phone and the USD is initiated.

In one embodiment, the communication protocol information for a variety of commonly used communication protocols is stored in the memory of the main unit. Alternatively, or additionally, the communication protocol information may be stored in the memory of the universal interface adapter.

In one embodiment, a number of interface adapters are supported by the USD including the following interface adapters. A Serial Interface Adapter is used to connect to the cell phone models equipped with a serial port connector. Due to serial port variations throughout cell phone brands, a corresponding adapter needs to be selected for establishing serial communication with the phone.

A serial interface PC adapter is used to connect to the computer with a ready serial port. Because the computer serial port is an accepted standard, a single serial interface pc adapter is able to work with most computers (e.g., a PC) with an available serial port. An universal serial bus (USB) adapter is used to connect to either a computer or a cell phone equipped with a USB port. Because USB port is an accepted standard, a single USB adapter can be used to communicate with most computers or cell phones that have an available USB port.

Additionally, an IrDA/Infrared adapter is utilized to connect to either a computer or a cell phone equipped with an IrDA port. An IrDA adapter can be used to communicate with any computer or cell phone with an activated IrDA port, as long as the USD remains within the infrared field. A RF/Bluetooth adapter is used to communicate with any computer or a cell phone that is Bluetooth compatible. A SIM card adapter allows the USD to function as a SIM card reader. The SIM card is the card that allows cell phones to access the global telecommunications network. It stores the user's own number, along with all the saved phone numbers. The SIM card reader function is a solution for those phone brands, for which serial interface adapter cannot be found, or which are not outfitted with USB, IrDA or Bluetooth ports.

In one embodiment, the USD includes a smart check system that reads the serial number of the personal electronic device (e.g., a cell phone) and does not allow overwriting of the data by transfer of data from a different phone. The smart check process reads the identification data of the cell phone and compares it to the identification data of the backup dataset currently on the USD. If identification data matches or if the dataset on the USD is blank, backup operation begins.

Upon clicking of the appropriate button (that is, backup or restore button), an appropriate protocol is loaded, USD performs a smart check function and begins to make the necessary data exchange for the requested operation. If any errors should occur during this process, a flashing red light appears.

Figure 1C:
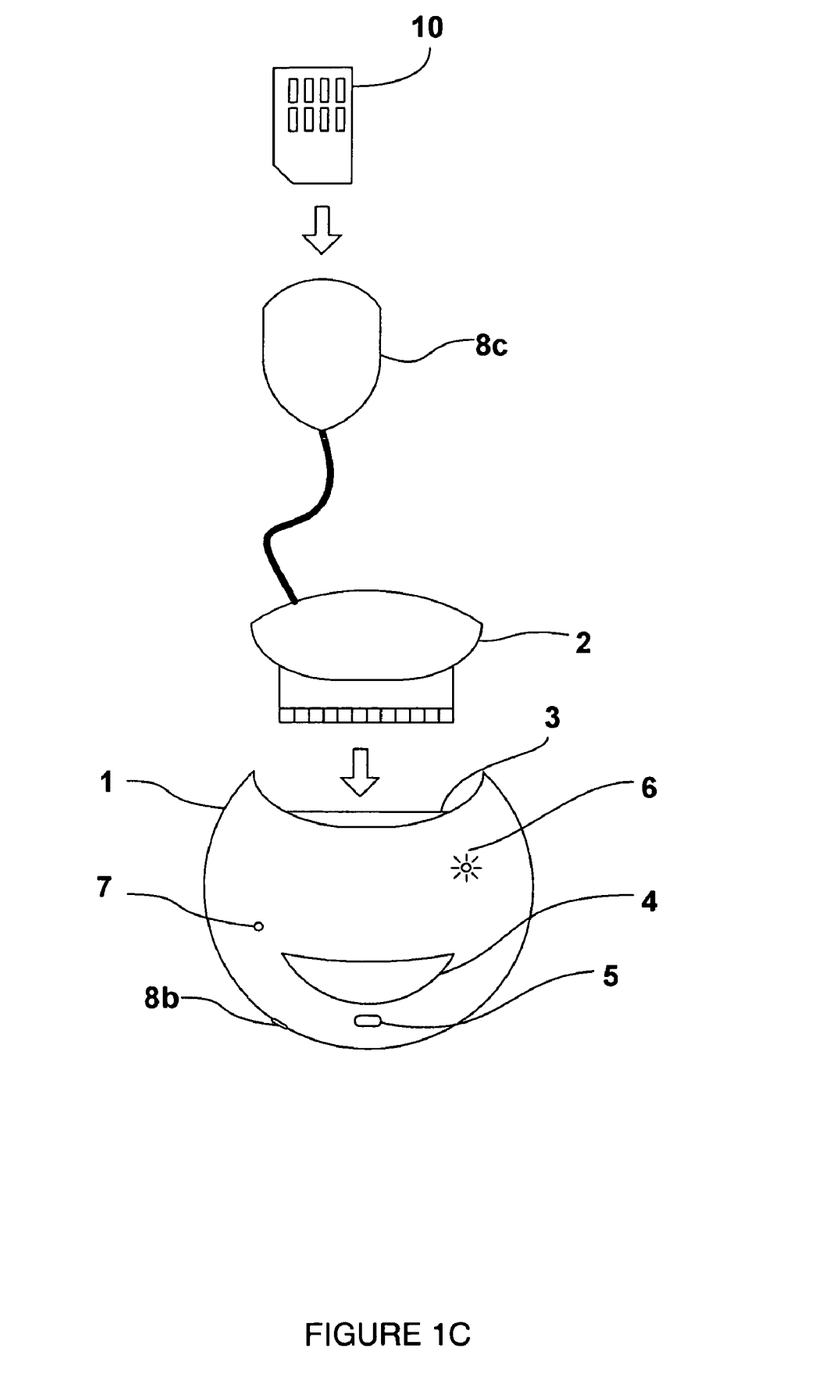
FIG. 1C depicts an USD that includes a SIM card reader, according to the present invention.

FIG. 1C is an exemplary block diagram of an USD that includes a SIM card. The interface adapter 2 plugs into the main unit 1. The interface adapter in this embodiment is tailored for operation of the SIM/media card 10. The card, whether it is a SIM or a flash card, is inserted into the interface adapter card housing 8c and performs the desired operations. The USD is also capable of reading other data sources, such as, SD cards, memory sticks, Flash cards, and the like.

Figure 2:
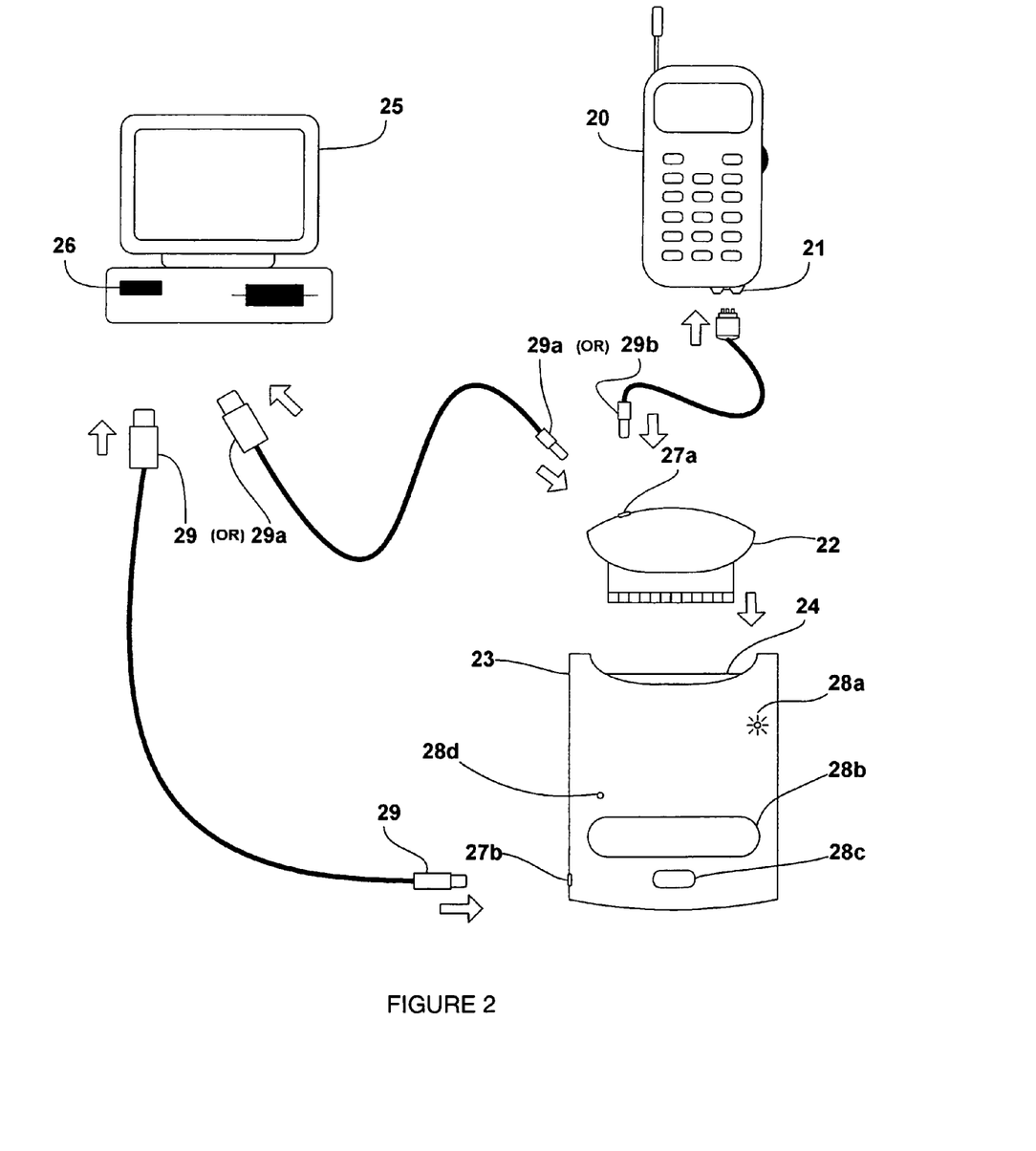
FIG. 2 is an exemplary block diagram of a system configuration, according to one embodiment of the present invention.

FIG. 2 is an exemplary block diagram of a system configuration including a cell phone 20, cell phone adapter port 21, an universal interface port adapter 22, a USD main unit 23, an interface adapter port 24, a PC 25, a PC adapter port 26 (e.g., USB, or Serial), device interface ports 27a and 27b, and relevant adapter cables 29a or 29b. Cell phone 20 connects to USD main unit 23 via cable 29b, which connects device interface port 27a and cell phone adapter port 21, through the interface port adapter 22 that is plugged into the adapter port 24 of the USD main unit 23. Because each cell phone may have a different design and technology for its respective communication port 21, the universal port adapter 22 and cable 29b bridge an interface between the USD and the cell phone 20 from various manufacturers. Cable 29a is used for connecting to a host via the interface port adapter 22.

Although the universal port adapter 22 is the primary means of USD's communication, the main unit 23 may be equipped with an USB and/or UART port 27b for adapter-free alternate means of communicating with a host. This feature also provides the USD with the capability of functioning as a standard data link cable between the PC and the cell phone extending a host of options that consumers may use, for example, Dial-up access or GPRS access. In this embodiment, the universal port adapter 22 is removable from the USD 23.

A user can backup data from the cell phone 20 into the USD 23 by pressing a Backup button 28b or restore the data from USD into the cell phone by pressing a Restore button 28c. The user can format data in USD by pressing a Format button 28d. The indicator 28a indicates the status of the USD by emitting different color lights. A PC 25 connects to USD's computer interface port 27a or 27b through the data link cable 29 or 29a. When connected to a host, a host interface mode is available with UART(RS232), IrDA, Bluetooth and USB adapters. Host interface mode is a feature which allows a host to access USD's content and manipulate it. The host mode feature enables the user to backup the data stored in the USD into the PC and make necessary firmware updates to the USD to support other cell phone models. In one embodiment, firmware for the interface port adapter 22 is downloaded from the PC 25 to program the interface port adapter for different protocols supported by different cell phones.

Figure 3A:
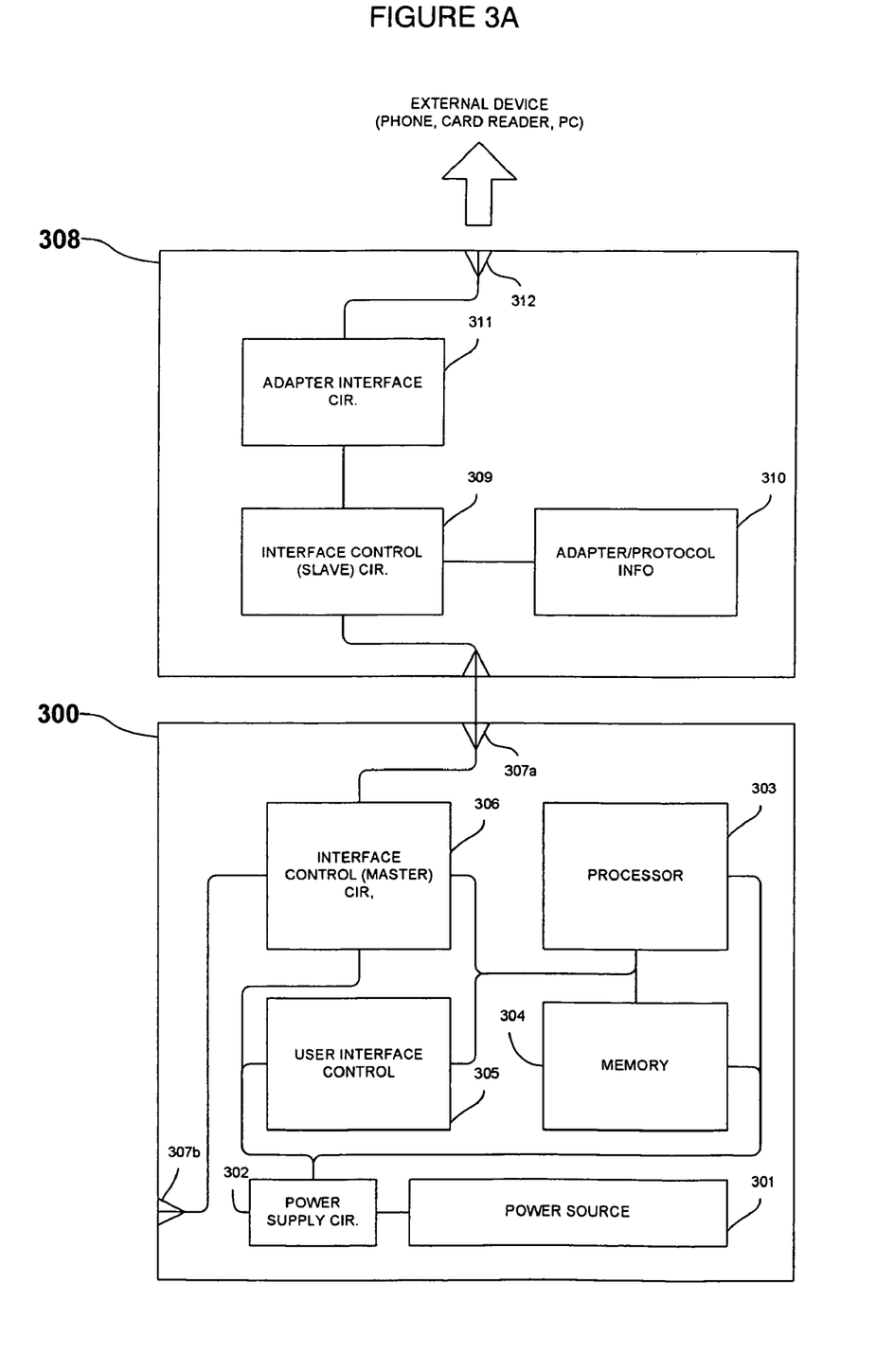
FIG. 3A is an exemplary hardware block diagram of an USD and an universal port adapter, according to one embodiment of the present invention.

FIG. 3A is an exemplary hardware block diagram an USD main unit 300 and an universal port adapter 308. The universal port adapter 308 includes adapter interface circuitry 311, interface control slave circuitry 309, and a memory unit 310 that stores the adapter identification and protocol information. The adapter interface circuitry 311 controls the physical connection elements between and external device and the adapter, performing tasks such as voltage conversions. Interface control slave circuitry 309 manages communication between the main unit 300 and an universal port adapter 308. Some of the interface control circuitry's 309 primary functions are adapter power management, adapter interface communication, and adapter operations control. The adapter interface circuitry 311 establishes the necessary communication link with the communication port of the cell phone.

In one embodiment, the universal interface adapter 308 includes an identification code to identify itself to the main unit. In this case, the universal interface adapter 308 depends on the main unit to have the necessary protocol information. In one embodiment, the universal interface adapter includes the necessary protocol information which is loaded into the main unit processor's 303 communication logic when the communication link is established.

The main unit 300 includes a processor 303. The processor provides various aspects of system control, such as user interface (I/O), reading and writing to memory, communicating with all adapter peripherals, and battery management. The processor also transfers data from and into memory 304.

The interface control host circuitry 306 is the main unit's counterpart of the interface control slave circuitry 309 within the universal port adapter 308. The interface control host circuitry 306 manages communication between the main unit 300 and an universal port adapter 308. The interface control host circuitry also controls communications with a host through host interface port 307b.

Also, included in the main unit 300 is an user interface circuitry 305 for managing user interface components. It supports interpretation of user interface features such as a backup, restore, format buttons and the display (indicators LCD/LED).

A battery 301 provides power for the power supply circuitry 302 which manages USD's power distribution. Depending on the cell phone model, the USD includes the capability to make use of a cell phone's power supply, thus extending the lifespan of USD's battery.

Figure 3B:
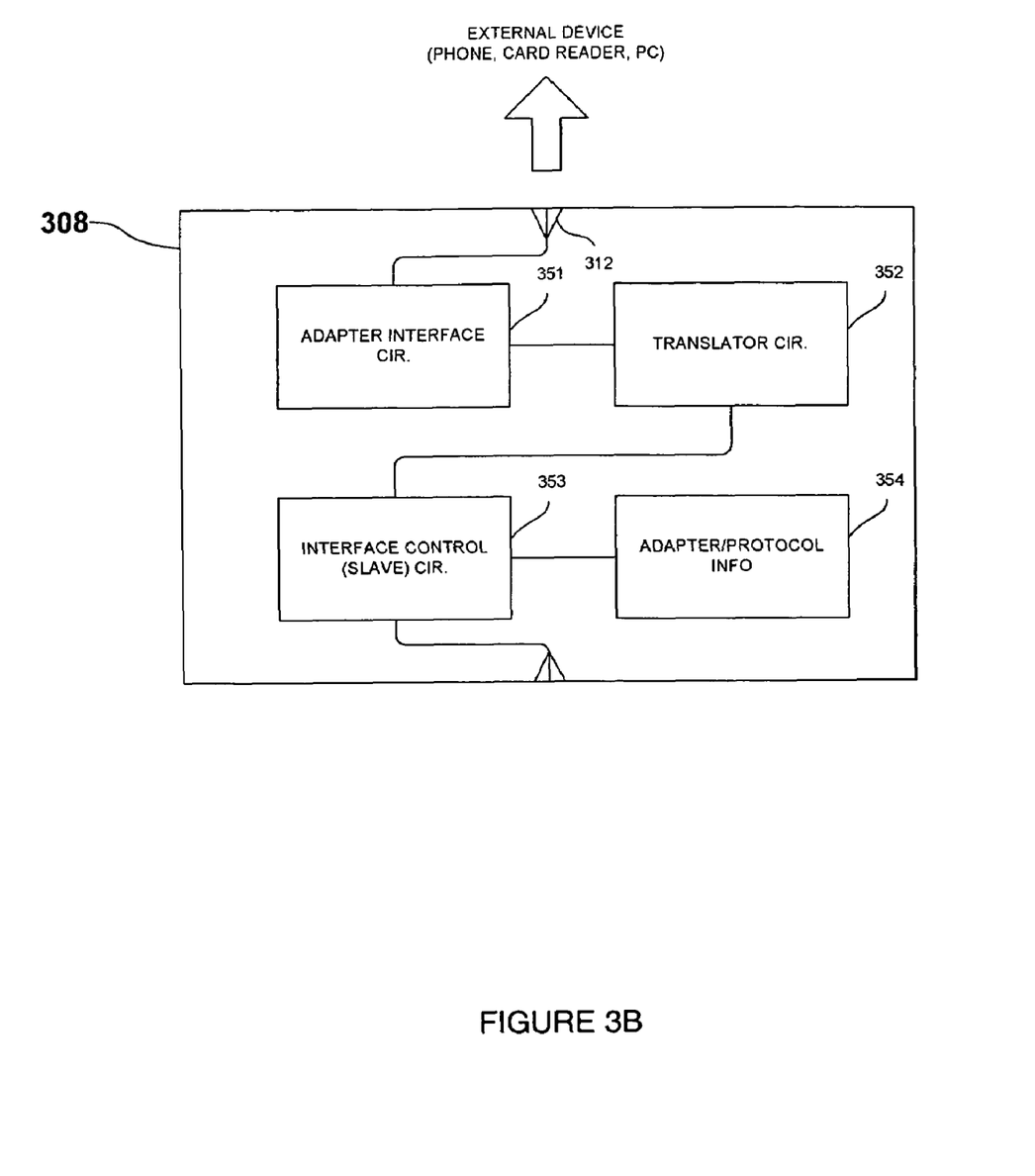
FIG. 3B is an exemplary hardware block diagram of an universal port adapter, according to one embodiment of the present invention.

FIG. 3b is an exemplary hardware block diagram of an universal interface adapter 308. In one embodiment, for devices with complex and/or unknown protocols, the universal interface adapter includes the basic protocol information which is used by the processor when the communication link is established. This also serves as a connection translator between the interface control slave circuit 353 and adapter interface circuit 351.

In this embodiment the interface adapter 308 houses the necessary translator circuitry 352 for establishing a communication with an external device. This configuration is used for interfacing with USB-based and Card Reader type of devices. Memory 354 stores protocol information and identification information of the interface adapter.

Figure 4:
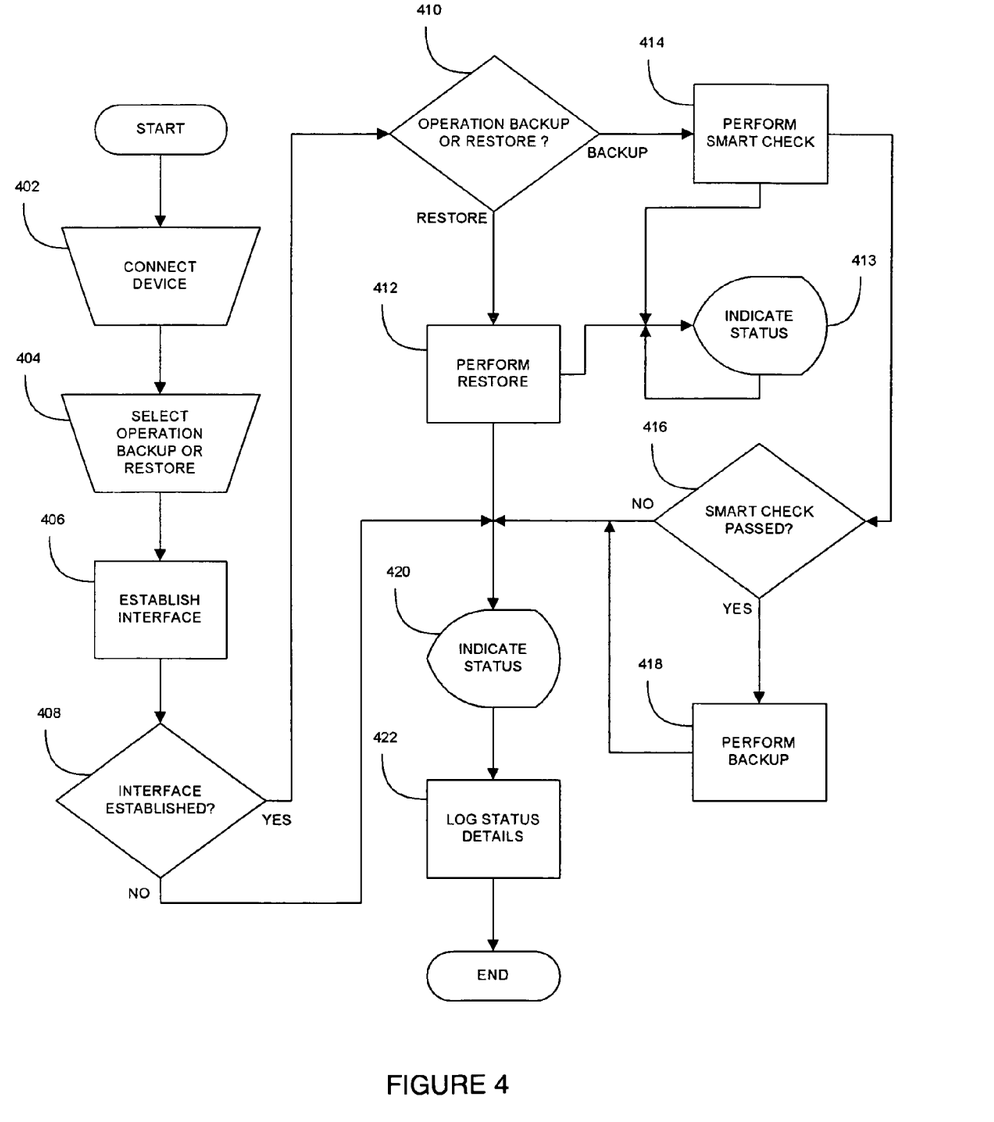
FIG. 4 is an exemplary flowchart of an USD's operations when connected to an universal port adapter and a cell phone, according to one embodiment of the present invention.

FIG. 4 shows an exemplary flowchart of an USD's operations when connected to an universal port adapter and a cell phone, according to one embodiment of the present invention. After an universal port adapter plugs into the USD and connects with a cell phone via a communication port (block 402), a backup or restore function is selected by pressing a respective button, as shown in block 404. At this point, an USD attempts to establish an interface with the connected device, as shown in block 406. If the communication link is established (in block 408), the process proceeds to block 410 to determine if the user requested operation was backup or restore.

If restore operation was selected, the USD begins the restore operation in block 412. Upon completion, the USD indicates the status of the entire operation in block 420.

If backup operation was selected, the USD reads the serial number of the user device in block 414 and checks if the serial number of device matches with serial number of the backup set in the USD in block 416. After a successful serial number match, the USD performs backup operation in block 418. Upon completion, the USD indicates the status of the entire operation in block 420 and logs status detail in block 422. During backup operation, the USD indicates the status by flashing an indicator, as shown in block 413. If a match between the serial id of the cell phone and the serial id of the last backup transaction is not found, the USD skips the backup operation, indicates the status (block 420), and logs connection details in block 420.

Figure 5A:
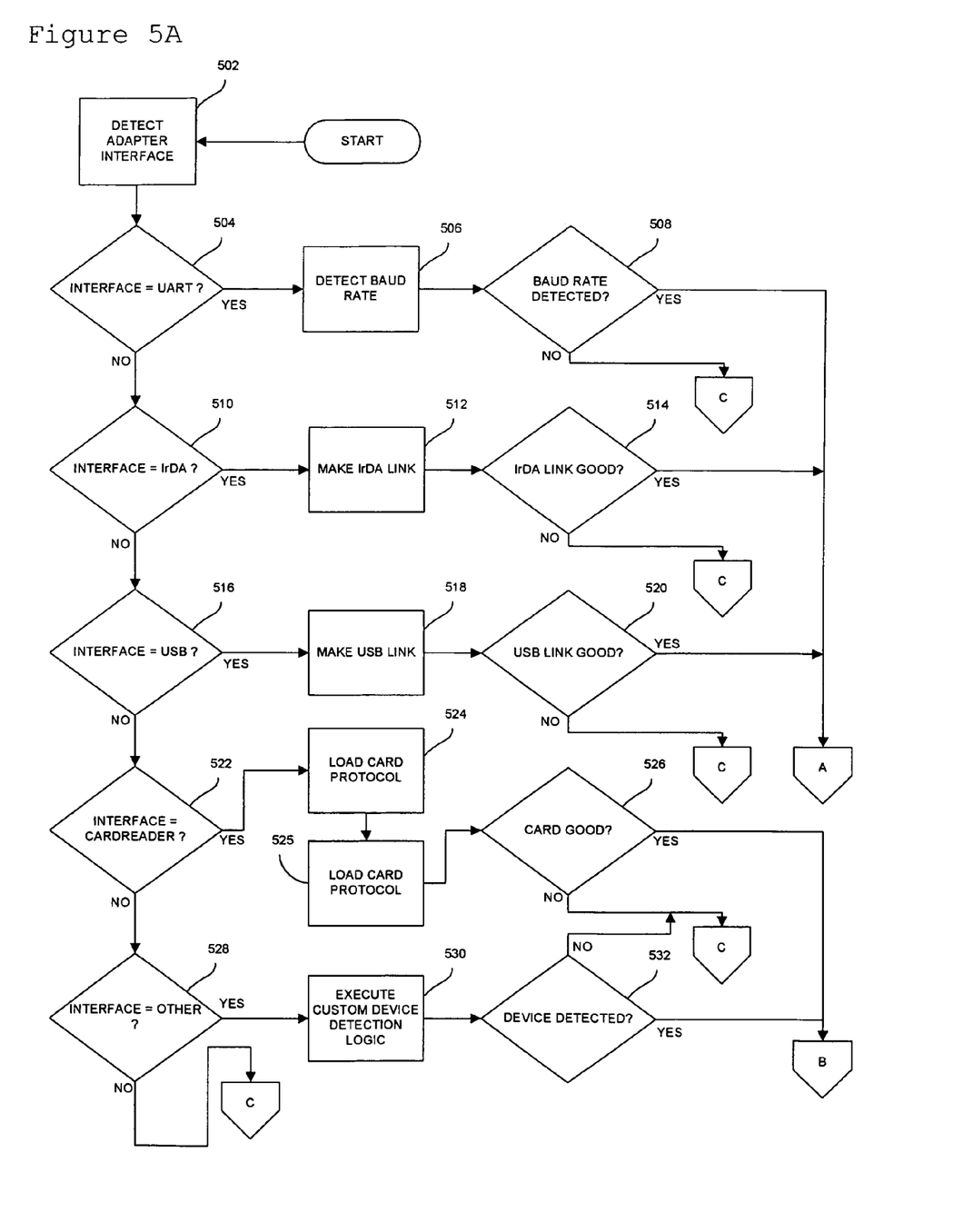
FIGS. 5A and 5B are exemplary flowcharts for establishing a communication protocol with a cell phone, according to one embodiment of the present invention.
Figure 5B:
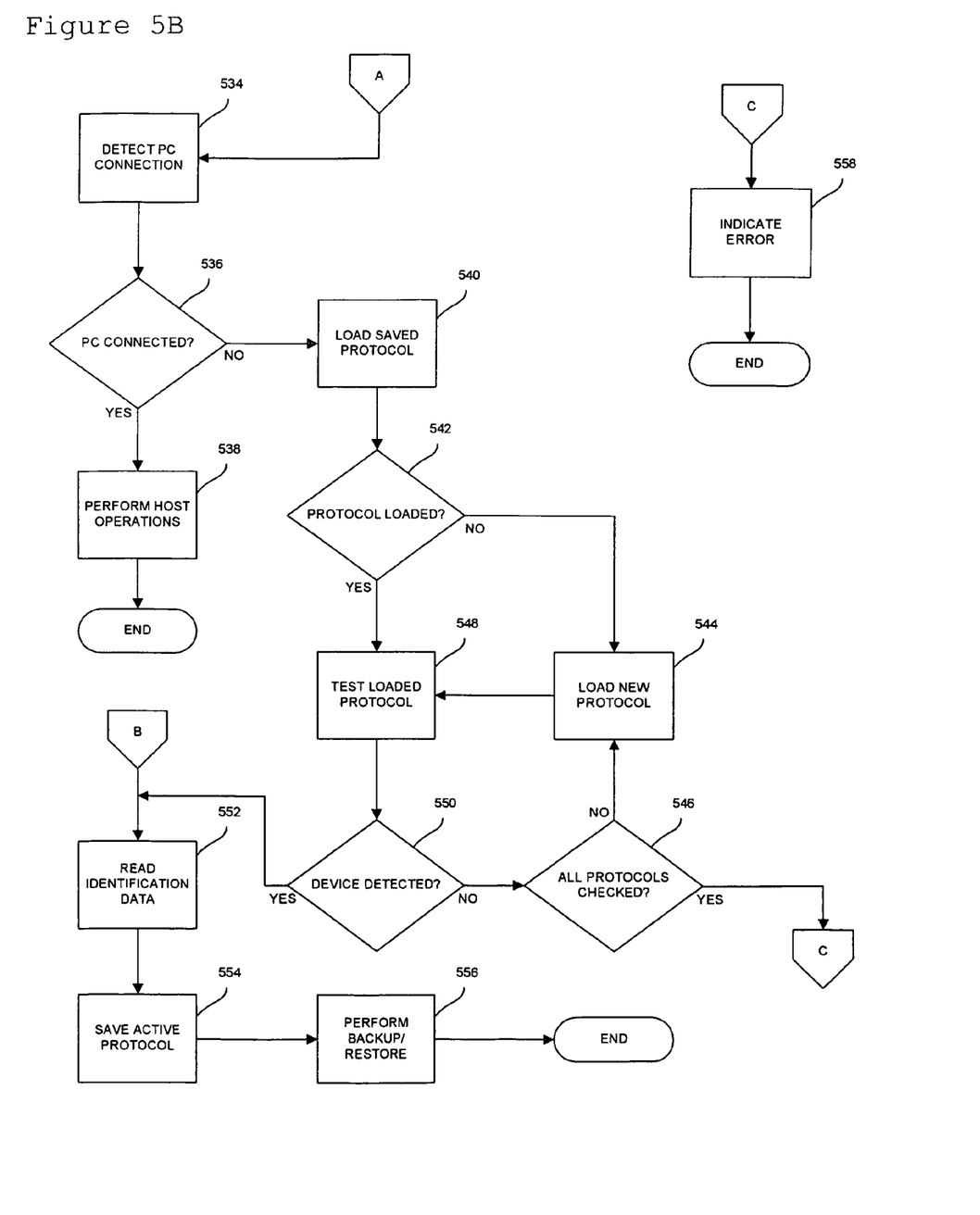

FIGS. 5A and 5B are exemplary process flows for establishing a communication protocol with an external device. The connected interface adapter may be a serial (UART) interface type adapter, infrared (IrDA) interface type adapter, USB interface type adapter, CardReader interface type adapter, or other interface type adapters. In block 502, the USD determines the type of interface adapter that is currently plugged into the main unit.

If the adapter interface type is UART (block 504), the USD detects the baud rate in block 506. In one embodiment, this is done by running a baud rate sequence check file for each known baud rate, starting with the highest supported baud rate and moving down to the lowest supported baud rate to determine the highest baud rate. When the baud rate is detected in block 508, the USD proceeds to detect a PC (host) connection in block 534 of FIG. 5B.

If the adapter interface type is IrDA (block 510), the USD attempts to establish an IrDA (infrared) connection using RFC-IrDA protocol specifications. When a viable IrDA link is established (blocks 512 and 514), the USD proceeds to detect a PC connection in block 534 of FIG. 5B.

If the adapter interface type is USB (block 516), an USB connection is attempted using RFC-USB protocol specification. When a viable USB link is established (blocks 518 and 520), the USD proceeds to detect a PC connection in block 534 of FIG. 5B.

Once the connection is established, the USD utilizes a host/pc connection check file to determine if the connection is in fact a host/pc connection in block 534. If a host/pc connection is verified in block 536, the USD changes its mode to a slave mode. If the connection is not a host/pc connection, the protocol last used by the USD is loaded in block 540. Before testing the protocol, a check is made to determine if the last used protocol is loaded successfully in block 542. In block 544, a new protocol is loaded from the adapter if the last used protocol is not loaded successfully. The protocol test of block 548 also functions to identify the connected external device.

If the protocol test for the currently loaded protocol fails, the next protocol is loaded in block 544. This process repeats until an appropriate protocol is detected (block 550) or all protocols have been tested (block 546). When an appropriate protocol is found in block 550, device identification data is retrieved in block 552, active protocol information is saved in block 554, and a back up or restore operation is performed in block 556. If any errors occur throughout the entire process, an appropriated error is triggered and a relevant indicator flashes in block 558.

In another example, where the adapter interface type is a card reader (block 522 of FIG. 5A), an appropriate protocol is loaded in block 524 and the card is checked in block 525. If the card is valid and recognizable (block 526), program execution is resumed. If any errors occur throughout the entire process, an appropriated error is triggered and a relevant indicator light flashes in block 558.

If the type of interface adapter used is not recognized by the USD (block 528), the USD launches a custom device detection logic in block 530 based on the instruction set provided by the interface adapter's memory. If the external device is one of the custom devices for which a supported protocol is found (block 532), program execution is resumed. If any errors occur throughout the entire process, an appropriated error is triggered and a relevant indicator light flashes in block 558.

The following exemplary quasi-code depicts establishment of a communication protocol.

```
Load protocol saved in memory from the main unit
    If protocol loaded successfully
    [TEST COMMUNICATION]
        Test communication using loaded protocol
            If device detected
                Read identification data from device
                Save active protocol in memory
                [RETURN TO PROGRAM EXECUTION]
            If device is NOT detected
                Check if all protocols have been tested
                    If all protocols have been tested
                        [INDICATE ERROR]
                    If NOT all protocols have been
                    tested
                        Load another protocol
                        GO TO [TEST COMMUNICATION]
    If protocol DID NOT load successfully
        Load another protocol
        GO TO [TEST COMMUNICATION]
```

The following exemplary quasi-code explains a backup operation.

```
[Detect Communication Port]
[Establish Communication Port/Interface]
    If Interface established
        Begin backup operation
        [SMART CHECK OPERATION] Retrieve and compare
        phone's serial number with one stored on the unit
            If serial number matches
                Begin sequential transfer of contacts
                from phone to units memory
                Check completion status
                    If status is successful
                        Upload status info as SMS
                        Text to device
                        Copy adapter id into unit's
                        memory
                        Copy phone's serial number to
                        unit's memory
                        [INDICATE SUCCESS]
                    If status IS NOT successful
                        Upload status info as SMS
                        Text to device
                        [INDICATE ERROR]
            If serial number DOES NOT match
                Check if memory is clear
                    If memory is clear
                        Begin sequential transfer of
                        contacts from phone to units
                        memory
                        Check completion status
                            If status is successful
                                Copy phone's serial
                                number to unit's
                                memory
                                Upload status info
                                as SMS Text to
                                device
                                [INDICATE SUCCESS]
                            If status is not
                            successful
                                Upload status info
                                as SMS Text to
```

```
                        device [INDICATE
                        ERROR]
            If memory IS NOT clear
                Upload status info as SMS
                Text to device
                    [INDICATE ERROR]
    If Interface is NOT established
        [INDICATE ERROR]
```

The following exemplary quasi-code explains a restore operation.

```
[Detect Communication Port]
[Establish Communication Port/Interface]
    If Interface established
        Begin Restore Operation
        Check if unit memory is clear
            If memory is clear
                Upload status info as SMS Text to
                device
                    [INDICATE ERROR]
            If memory is NOT clear
                Begin sequential transfer of contacts
                from unit to phone memory
                Check completion status
                    If status is successful
                        Copy phones serial number to
                        unit's memory
                        Upload status info as SMS
                        Text to device
                            [INDICATE SUCCESS]
                    If status IS NOT successful
                        Upload status info as SMS
                        Text to device
                            [INDICATE ERROR]
```

```
    If Interface is NOT established
        [INDICATE ERROR]
```

In one embodiment, in addition to the back up and restore operations, a PC link operation can also be requested by pressing an existing button, for example, the backup button, when connected to a computer. Alternatively, the PC link operation is established by simply plugging the USD into the PC. Once the PC link operation is selected, an appropriate communication protocol with the PC is established. The user can then edit and format the data on the PC. A software residing on the PC enables the user to interface a PC with the USD. This software allows the user to create data and save it in the USD. It also allows the back up data that was transferred from the USD onto the PC be edited and modified and then reloaded to the USD. From the USD the modified data may then be downloaded to the cell phone. Using the software, a user can add, edit, and delete entries stored in the USD. In one embodiment, the software includes an "Export" feature, that allows saving all contacts in a delimited format, so that the users can import these contacts into their favorite program. Other uses of the PC/host connection include synchronization, firmware updates, and the like.

In one embodiment, a Format button is also provided on the USD. Pressing this button clears the memory in the USD. The LED indicator begins to flash indicating that the USD is formatting its memory. When the memory is cleared, the LED status indicator will flash indicating that the memory is cleared.

Table 1 illustrates different patterns and colors for the LED indicator and their interpretations, according to one embodiment of the present invention.

TABLE 1

Interpreting LED Indicator

| Color & Pattern | Operation Mode | | | Interpretation | Solution |
| --- | --- | --- | --- | --- | --- |
| | Backup | Restore | PC Link | | |
| Normal Indications: | | | | | |
| Green 1* | ● | ● | | Operation Successful | |
| Green 2* | ● | ● | | Operation successful (new phone) | |
| Green 3* | | | | Format operation successful | |
| Progress Indications: | | | | | |
| Amber Flashing | ● | ● | ● | Unit performing operation. | |
| Error Indications: | | | | | |
| Red Lit | ● | ● | ● | Internal error | |
| Red 1* | ● | ● | | Phone Connector is unplugged. | Check phone connector. |
| | | | | IrDA link is not established. | Check adapter connection. |
| | | | | IrDA link breaks during operation | Make sure IrDA port on the phone is activated. Make sure infrared communication field is not interrupted during operation. |
| | | | | Phone not recognized | Check if phone model is supported by adapter. |
| | | | | Bad data | Turn phone OFF then back ON. Restart operation. |
| | | | ● | PC Link breaks during operation Software communication failure | Check data link cable. Check PC. Check host software. |

TABLE 1-continued

Interpreting LED Indicator

| Color & Pattern | Backup | Restore | PC Link | Interpretation | Solution |
|---|---|---|---|---|---|
| Red 2* | ● | | | Memory taken up by a different phone. | Either format the USD or restore contacts on the phone |
| | | | | Unit memory full. Not all data backed up. | Delete few contacts from phone and try backup again. |
| | | ● | | Phone memory full. Not all data restored. | Delete a few contacts from the USD with PC Software and try again. |
| | | | | Unit memory empty | Back data up before restore. |
| Red 3* | ● | ● | ● | Low Battery | Replace Battery |

*Number of blinks per second.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A portable mobile phone backup device, comprising:
a mobile and compact handheld enclosure;
a purpose-specific communication port housed within the handheld enclosure and configured to receive an external removable mobile phone-dependent communication adapter associated with one or more types of mobile phones, the mobile phone-dependent communication adapter for communicatively coupling the portable mobile phone backup device to a mobile phone;
a memory device for storing telephone numbers received by the portable mobile phone backup device; and
a purpose-specific processing circuit housed within the mobile and compact handheld enclosure and coupled to the purpose-specific communication port and memory device, the purpose-specific processing circuit permanently programmed to
uniquely identify the mobile phone coupled to the purpose-specific communication port by obtaining a unique mobile phone identifier from the mobile phone,
retrieve phone numbers from the mobile phone over the purpose-specific communication port,
store the retrieved phone numbers and mobile phone identifier in the memory device, and
associate the unique mobile phone identifier with phone numbers stored in the memory device, wherein the mobile phone identifier corresponds to the mobile phone from which the phone numbers are retrieved.

2. The device of claim 1 further comprising:
a purpose-specific backup button mounted on the mobile and compact handheld enclosure and coupled to the purpose-specific processing circuit, the purpose-specific backup button hardwired to cause the purpose-specific processing circuit to autonomously initiate transfer of phone numbers from the mobile phone and store them in the memory device.

3. The device of claim 1 further comprising:
a purpose-specific restore button mounted on the mobile and compact handheld enclosure and coupled to the purpose-specific processing circuit, the purpose-specific restore button hardwired to cause the purpose-specific processing circuit to autonomously initiate transfer of phone numbers from the memory device to the mobile phone.

4. The device of claim 1 further comprising:
a purpose-specific reset button mounted on the handheld enclosure and coupled to the purpose-specific processing circuit, the purpose-specific reset button hardwired to cause the purpose-specific processing circuit to clear the phone numbers stored in the memory device.

5. The device of claim 1 wherein the processing circuit is further configured to
prevent overwriting any existing phone numbers stored in the memory device when new phone numbers are retrieved.

6. The device of claim 1 wherein the processing circuit is further configured to
verify whether a new set of phone numbers originate from a mobile phone having the same mobile phone identifier as the phone numbers in the memory device prior to overwriting the existing phone numbers stored in the memory device.

7. The device of claim 1 further comprising:
a first removable mobile phone-dependent communication adapter associated with one or more models of mobile phones, the first removable mobile phone-dependent communication adapter external to the handheld enclosure and coupled to the purpose-specific communication poll.

8. The device of claim 7 wherein the first removable mobile phone-dependent communication adapter includes:
an interchangeable mobile phone connector at one end of a cable for coupling to a mobile phone, wherein the mobile phone connector is interchangeable to accommodate different types of mobile phone connectors.

9. The device of claim 7 wherein the first removable mobile phone-dependent communication adapter includes
a second memory device for storing one or more of communication protocols, wherein the second memory device for providing the purpose-specific processing circuit one or more protocols with which to attempt communications with the mobile phone.

10. The device of claim 9 wherein the second memory device includes an adapter identification code identifying an adapter type to the purpose-specific processing circuit.

11. The device of claim 7 wherein the first removable mobile phone-dependent communication adapter includes
a first communication interface for detachably coupling to the purpose-specific communication port; and
a second communication interface for coupling to the mobile phone and facilitate transfer of phone numbers between the second communication interface and the first communication interface.

12. The device of claim 11 wherein the first removable mobile phone-dependent communication adapter includes
a translation circuit coupled between the first communication interface and the second communication interface for translating between two or more communication interfaces between the first communication interface and the second communication interface under the control of the purpose-specific processing circuit.

13. The device of claim 7 wherein the first removable mobile phone-dependent communication adapter operates as a slave under the control of the purpose-specific processing circuit.

14. The device of claim 7 further comprising an adapter enclosure for housing the first removable mobile phone-dependent communication adapter, the adapter enclosure shaped to complement the mobile and compact handheld enclosure and form a completed shape with the mobile and compact handheld enclosure.

15. The device of claim 14, wherein the handheld enclosure and mobile phone-dependent communication adapter form a puck shape.

16. The device of claim 1 further comprising:
a second removable communication adapter external to the handheld enclosure, the second removable communication adapter coupled to the purpose-specific communication port and to an external computer to transfer the phone numbers from the memory device to the external computer.

17. The device of claim 1, further comprising:
a power source housed within the handheld enclosure and coupled to the purpose-specific processing circuit.

18. The device of claim 1 wherein the purpose-specific processing circuit is further configured to obtain one or more external instructions that upgrade the operation of the processing circuit.

19. A portable mobile phone backup device, comprising:
a mobile and compact handheld enclosure;
a mobile phone communication adapter, the mobile phone communication adapter for communicatively coupling the portable mobile phone backup device to a mobile phone;
a memory device for storing telephone numbers received by the portable mobile phone backup device; and
an application-specific control circuit housed within the mobile and compact handheld enclosure and coupled to the mobile phone communication adapter and memory device;
a backup button mounted on the mobile and compact handheld enclosure and coupled to the control circuit, the purpose-specific backup button hardwired to cause the control circuit to autonomously initiate transfer of phone numbers from the mobile phone and store them in the memory device.

a restore button mounted on the mobile and compact handheld enclosure and coupled to the control circuit, the purpose-specific restore button hardwired to cause the control circuit to autonomously initiate transfer of phone numbers from the memory device to the mobile phone.

20. The device of claim 19 further comprising:
a purpose-specific reset button mounted on the handheld enclosure and coupled to the control circuit, the purpose-specific reset button hardwired to cause the control circuit to clear the phone numbers stored in the memory device.

21. The device of claim 19 wherein the control circuit is configured to:
uniquely identify the mobile phone coupled to the mobile phone communication adapter by obtaining a unique mobile phone identifier from the mobile phone, and
associate the unique mobile phone identifier with phone numbers stored in the memory device, wherein the mobile phone identifier corresponds to the mobile phone from which the phone numbers are retrieved.

22. The device of claim 21 wherein the control circuit is further configured to
prevent overwriting any existing phone numbers stored in the memory device when new phone numbers are retrieved.

23. The device of claim 19 wherein the handheld enclosure is substantially palm size and has a puck shape.

24. The device of claim 19 wherein the mobile phone communication adapter is removable from the portable mobile phone backup device and interchangeable with other mobile phone communication adapters for different types of mobile phones.

25. A portable mobile phone backup device, comprising:
a mobile and compact handheld enclosure;
a mobile phone communication adapter, the mobile phone communication adapter for communicatively coupling the portable mobile phone backup device to a mobile phone;
a memory device for storing telephone numbers received by the portable mobile phone backup device;
a processing circuit housed within the mobile and compact handheld enclosure and coupled to the mobile phone communication adapter and memory device, the processing circuit permanently configured to independently transfer phone numbers to and from the mobile phone to which the communication adapter is coupled; and
a backup button coupled to the control circuit and hardwired to cause the control circuit to autonomously transfer phone numbers from the mobile phone and store them in the memory device.

26. The device of claim 25 wherein the processing circuit is further configured to obtain one or more external instructions that upgrade the operation of the processing circuit.

27. The device of claim 26 wherein the one or more external instructions provide additional protocols that can be used by the processing circuit to communicate with different mobile phones.

* * * * *